United States Patent
Lynch

[11] Patent Number: 5,509,149
[45] Date of Patent: Apr. 23, 1996

[54] COMBINED CHILD COMMODE AND AMUSEMENT DEVICE

[76] Inventor: Virginia Lynch, 2288 Risco Dr., Laughlin, Nev. 89029

[21] Appl. No.: 375,998

[22] Filed: Jan. 20, 1995

[51] Int. Cl.$^6$ .................................................. A47K 11/04
[52] U.S. Cl. ............................................. 4/476; 297/172
[58] Field of Search ............................ 4/144.1, 462–484, 4/449; 297/156, 170, 172

[56] References Cited

U.S. PATENT DOCUMENTS

| | | | |
|---|---|---|---|
| 1,199,186 | 9/1916 | Jiranek | 4/478 |
| 1,489,304 | 4/1924 | Brown | 4/478 |
| 2,390,854 | 12/1945 | Thompson | 4/474 |
| 2,552,002 | 5/1951 | Dunbar | 4/478 X |
| 2,930,612 | 3/1960 | Goodrich | 4/479 X |
| 3,176,319 | 4/1965 | Mackey | 4/144.1 X |
| 4,057,244 | 11/1977 | Gaspar | 297/156 X |
| 4,373,715 | 2/1983 | Henn | 4/476 X |

FOREIGN PATENT DOCUMENTS

| | | | |
|---|---|---|---|
| 135206 | 2/1947 | Australia | 4/483 |

*Primary Examiner*—Charles E. Phillips
*Attorney, Agent, or Firm*—Michael I. Kroll

[57] ABSTRACT

A child's commode is combined with an educational work desk or, in another embodiment, with a wheeled simulated riding animal. Both embodiments provide assistance in the difficult task of toilet training a child by giving the child a positive motivation to occupy the commode. A lid may be lowered to cover the commode portion and form a desk seat. In the case of the wheeled riding animal a saddle may be lowered to cover the pot portion for useful play well beyond the potty training age of the child. Both embodiments include a vertically extending, rearward projecting handle for ease of pot removal and cleaning. In the case of the animal simulation, the handle is in the form of a simulated animal tail.

5 Claims, 2 Drawing Sheets

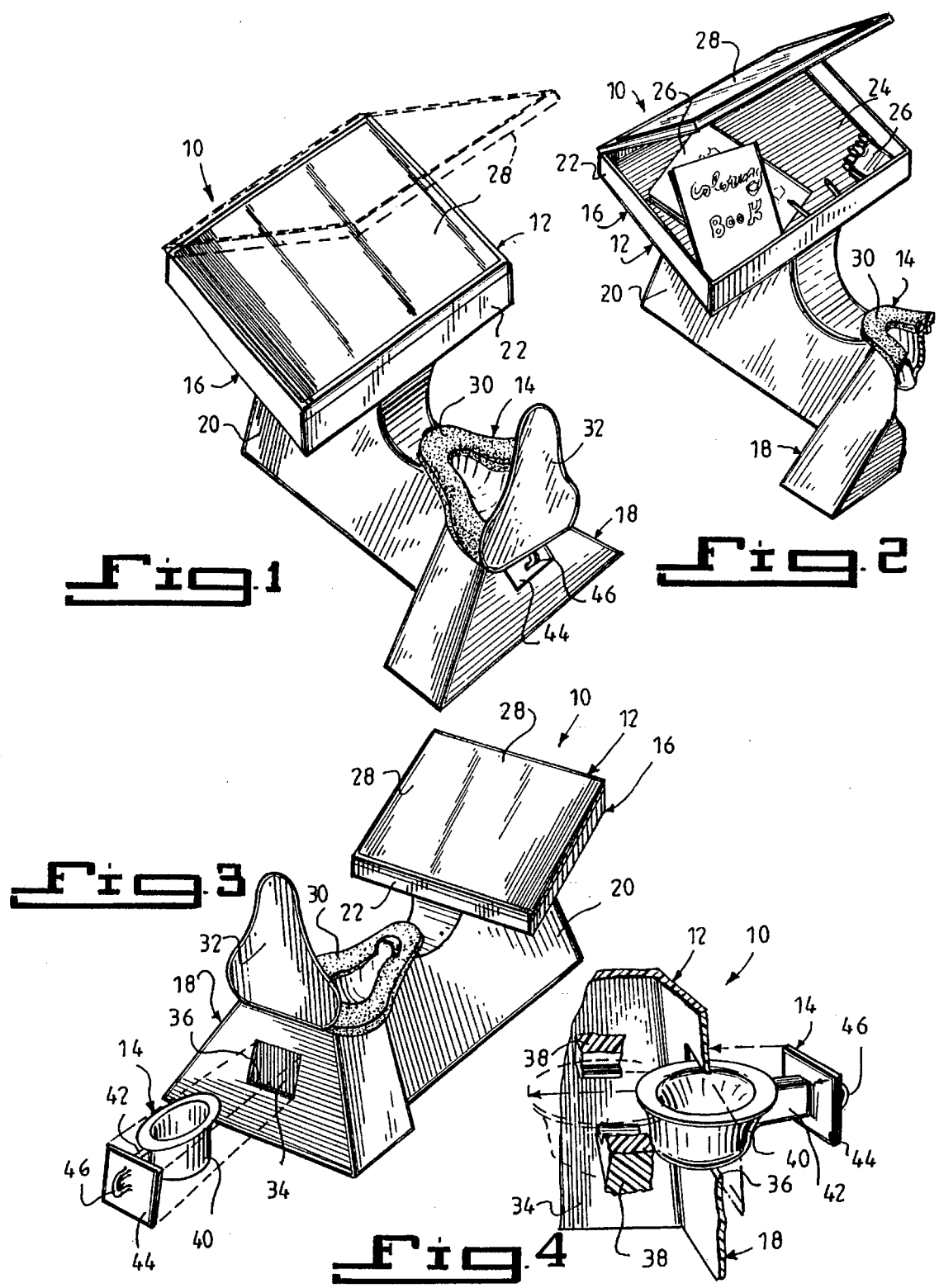

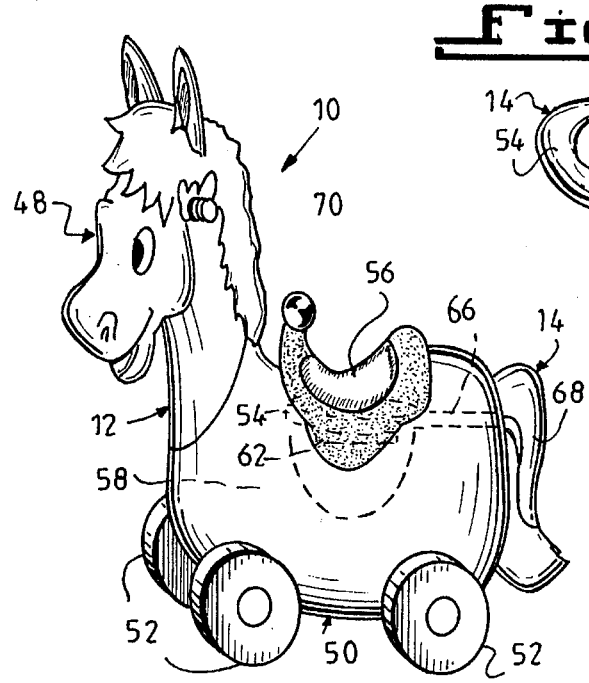
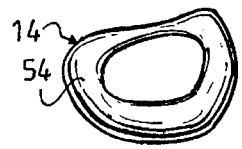
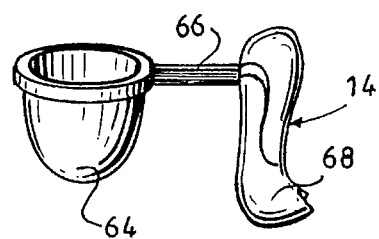
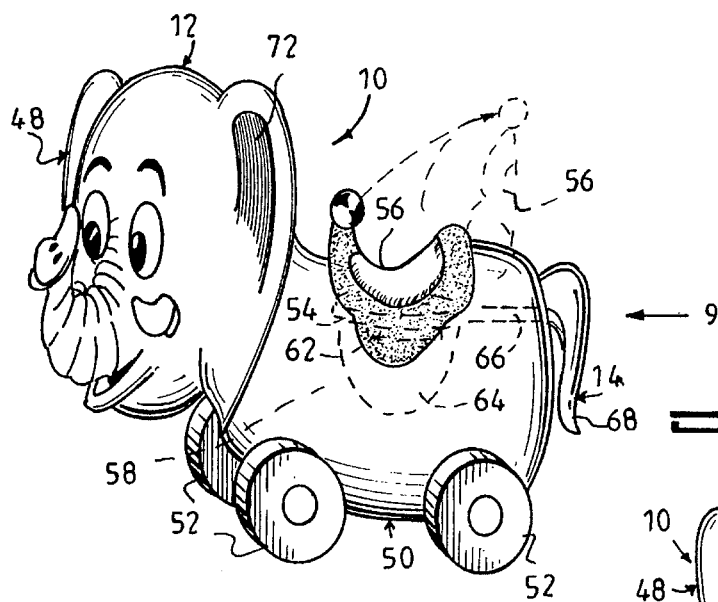
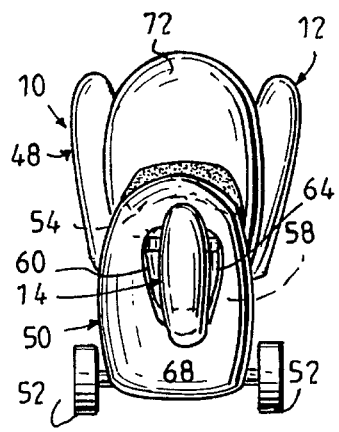

COMBINED CHILD COMMODE AND AMUSEMENT DEVICE

CROSS-REFERENCE TO RELATED APPLICATION

This application is related to application Ser. No. 07/750,075, filed Aug. 26, 1991, now abandoned.

BACKGROUND OF THE INVENTION

1. Field of the Invention

The present invention relates to infant toilets and more specifically it relates to an improved potty which is suitable for use as a riding toy by the child as they gain maturity. A riding toy aspect of the invention envisions animal simulations of many sorts. These may be educational in the sense that the child may become familiar with many animals which may not be available in real life. For example, an extinct dinosaur or common farm animal could equally well be simulated. Another form of the invention provides a combined commode and desk for amusement of the child during potty training. The fields of home and institutional child care and education are seen as the most obvious benefactors of the unique advantages of the instant invention.

Thus it can be seen that the potential fields of use for this invention are myriad and the particular preferred embodiments described herein are in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for infant toilet training are old and well known in the art. Rarely, however, are toilet training devices combined with other useful functions for the care or entertainment of the child. Numerous infant toilets have been provided in the prior art that are adapted to include small pots for use as toilets by infants and young children. While these units may be suitable for the particular purpose to which they address, they would not be as suitable for the purposes of the present invention as heretofore described. The following known prior art has been directed to providing some sort of infant commode. As will be seen, the simplicity and effectiveness of my invention is not rivaled in the prior art.

U.S. Pat. No. 4,373,715, issued to Henn on Apr. 1, 1981, shows a riding animal device for children in which the identity of the animal can be changed from time to time by removal of the head and tail portions representing a different animal. The body portion may be recessed and equipped with a removable receptacle part in the form of a saddle having an opening from which depends a catch receptacle for use as a chamber pot to catch and retain body wastes excreted by a child undergoing toilet training, or for use as a container for flowers, plants, or the like if it is desired the animal device be used for decoration or display purposes. The head is preferably mounted for up and down oscillation by means of a bridle and reins attached thereto. removal of the pot for emptying and cleaning must be done by physically lifting the entire receptacle from the animal with both hands. The patent shows not wheels to permit the object to be used as a riding toy. By contrast, the instant invention has wheels on its animal simulation to permit use as a riding toy. By further contrast, the instant invention has pot removal structure permitting easy rearward and one-handed removal of the pot for cleaning and emptying.

U.S. Pat. No. 1,199,186, issued to Jiranek on Sep. 26, 1916, shows an infant commode combined with a dressing cabinet. The patent provides no wheels, animal simulation, or any other feature of educational or amusement value to the child. Also, the patent shows no convenient means of emptying or removing the pot for cleaning. By contrast the instant invention includes an educational desk or animal simulation which doubles as a riding toy. By further contrast, the instant invention provides convenient emptying means not requiring the lifting of the pot.

U.S. Pat. No. 1,489,304, issued to Brown on Apr. 8, 1924, shows a child commode or potty convertible into a chair. The patent provides no wheels, animal simulation, or any other feature of educational or amusement value to the child. However, similar to the instant invention, the patent shows a pot slidable on and supported by tracks. By contrast, the device of the instant invention shows an educational desk or animal simulation which doubles as a riding toy.

U.S. Pat. No. 2,939,612, issued to Goodrich on Mar. 29, 1960, Shows a rocking horse with a built in potty chair. The patent is similar to the instant invention as to the combination of a potty chair with a simulated animal. The patent shows no wheeled riding toy and is silent on how removal of the pot is not interfered with by the simulated animal tail. By contrast, the device of the instant invention provides a wheeled riding toy animal simulation. By further contrast, the rearward pot removal of the instant invention is accomplished by means of the simulated animal tail thus eliminating all possibility of interference.

U.S. Pat. No. 3,176,319, issued to Mackey on Apr. 6, 1965, shows a child's training chair and urinal. A desk stand structure is shown supporting a removable urinal. The patent provides no wheels or animal simulation. By contrast, the device of the instant invention includes an animal simulation which doubles as a riding toy.

Australian Patent No. 135,206, issued to Dawson on Nov. 10, 1949, shows a combined high chair and potty chair. An eating tray is positioned in front of the child while seated in the chair. The pot is rearwardly removable but is not supported by rails. By contrast, the instant invention provides a riding animal simulation with a rearwardly removable pot supported on rails to assure close proximity to the user.

It will be noted that none of the prior art devices show a wheeled animal simulation in combination with a child's commode.

None of the above inventions and patents, taken either singly or in combination, is seen to describe the instant invention as claimed.

SUMMARY OF THE INVENTION

Briefly, the invention comprises a child's commode combined with an educational work desk. Another embodiment comprises a child's commode combined with a wheeled simulated riding animal. Both embodiments provide assistance in the difficult task of toilet training a child by giving the child a positive motivation to occupy the commode. A lid may be lowered to cover the commode portion and form a desk seat. In the case of the wheeled riding animal a saddle may be lowered to cover the pot portion for useful play well beyond the potty training age of the child. Both embodiments include a vertically extending, rearward projecting handle for ease of pot removal and cleaning. In the case of the animal simulation, the handle is in the form of a simulated animal tail.

Accordingly, it is a principal object of the invention to provide a new and improved child commode and amusement device which overcomes the disadvantages of the prior art in a simple but effective manner.

It is a major object of this invention to provide an improved child commode and amusement device which provides for easy removal and cleaning of the pot portion of the commode.

Another object is to provide an improved toilet that will take the trauma out of potty training an infant, by making it a fun experience for the infant to sit upon the commode.

An additional object is to provide an improved commode that is in the shape of a desk or an animal which can be sat upon, so that with something in front of the infant, it will feel safer than sitting on a standard potty.

An additional object is to provide an improved commode that is useful as an educational and amusement device long after the infant passes the age of toilet training.

It is another object of the invention to provide a child commode incorporated into a simulated animal which may be used as a riding toy when not being used for toilet training.

It is another object of the invention to provide a child commode incorporated into a play desk that can be used for play when not being used for toilet training.

It is another object of the invention to provide a child commode incorporated into a simulated animal which may be emptied by simply pulling the tail of the simulated animal.

A further object is to provide an improved potty that is simple and easy to use.

A still further object is to provide an improved potty that is economical in cost to manufacture.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a perspective view of a first embodiment of the instant invention in the shape of a desk with the desk top lid closed and the cover opened to expose the potty seat.

FIG. 2 is a perspective view similar to FIG. 1, with parts broken away and the desk top lid opened to show the storage compartment therein.

FIG. 3 is a perspective view of the first embodiment showing the pot assembly pulled out therefrom.

FIG. 4 is a perspective view of the first embodiment with parts broken away showing the track supports therein to engage with the pot assembly.

FIG. 5 is a perspective view of a second embodiment of the instant invention in the shape of a horse.

FIG. 6 is a perspective view of the potty seat used with the embodiment of FIG. 5.

FIG. 7 is a perspective view of the cover in the shape of a saddle used with the embodiment of FIG. 5.

FIG. 7A is a perspective view of the pot assembly and animal tail assembly used with the embodiment of FIG. 5.

FIG. 8 is a perspective view of the second embodiment of the instant invention in the shape of an elephant.

FIG. 9 is a rear view taken in direction of arrow 9 in FIG. 8 showing the opening for rearward removal of the pot from the simulated animal.

DETAILED DESCRIPTION OF THE PREFERRED EMBODIMENTS

The combined commode and amusement device of the present invention is generally designated by arrow 10 in the Figures. The device comprises the following main parts; toy structure 12, and commode or potty structure 14.

Turning now descriptively to the drawings, the Figures illustrate an improved potty 10 which consists of a toy structure 12 that sits upon a flat surface and a potty structure 14 built into the toy structure 12. A portion of the toy structure 12 is in front of the potty structure 14, so that when an infant sits upon the potty structure 14 for toilet training, the infant will feel safe thereon. In all the illustrated embodiments, the potty structure 14 is removable rearwardly from the toy structure 12.

As shown in FIGS. 1 through 4, the toy structure 12 includes a respective configuration corresponding to a play desk 16 with a seat support 18 attached thereto. The desk includes a stanchion 20 to set on a flat support surface. A table top 22 is affixed to the stanchion 20 and has a compartment 24 for storing various play items 26, such as a coloring book and crayons. A lid 28 is hinged to a forward edge of the table top 22, so as to cover the compartment 24 so that the infant sitting on the potty structure 14 can write and draw on the lid 28.

The potty structure 14 includes a potty seat 30 mounted to the top of the seat support 18 which is attached to the stanchion 20 of the desk 16. A cover 32 is hinged to the potty seat 30. When the cover 32 is in an up position the infant can sit on the potty seat 30 to toilet train. When the cover 32 is in a down position the infant can sit on the cover 32 and use it as a normal seat. The seat support 18 has a chamber 34 therein with a rear access aperture 36. A track structure 38 is carried within the chamber 34 of the seat support 18.

A pot 40 engages with the track structure 38 and is positioned under the potty seat 30, so as to receive waste matter from an infant sitting on the potty seat 30. An arm 42 extends transversely from one side of the pot. A plate 44 is mounted at a right angle to a distal end of the arm 42 and a handle 46 is affixed to the plate 44 so that a person can grip the handle 46 to properly position the pot 40 within the chamber 34 on the track structure 38 with the plate 44 covering the rear access aperture 36 in the seat support 18. In this manner the pot structure 14 can easily be rearwardly removed from chamber 34 for emptying and cleaning. The artisan will note that the hand of the cleaning person need never come in close proximity with the pot containing the waste material by this arrangement. Also, the vertical orientation of handle 46 facilitates easy one-handed removal of pot 40. When pot 40 is fully installed in the inner cavity 34 the handle 46 projects rearwardly beyond seat support 18 and plate 44 fully covers rear access aperture 36. It will be noted that this eliminates the need for any sort of separate door to cover aperture 36.

FIGS. 5, 8 and 9 show the improved potty 10 wherein the toy structure 12 includes a respective configuration corresponding to a simulated animal 48 with a seat-support 50 attached thereto. The simulated animal 48 further includes a plurality of wheels 52, so that it can roll upon a flat surface. The wheels may be fitted with suitable brakes for immobilizing the commode support structure during use as a toilet training device. This potty support structure thus doubles as a riding toy for the infant after he has passed the age of toilet training.

The potty structure 14 includes a potty seat mounted to the top of the seats support 50 and a saddle cover 56 hinged to the potty seat 54. When the saddle cover 56 is in an up position the infant can sit on the potty seat 54 to toilet train. When the saddle cover 56 is in a down position the infant can sit on the saddle cover 56 to ride the simulated animal 48. The seat support 50 has a chamber 58 therein with a rear access aperture 60.

A track structure 62 is carried within the chamber 58 of the seat support 50. A pot 64 engages with the track structure 62 and is positioned under the potty seat 54, so as to receive waste matter from the infant sitting on the potty seat 54. An arm 66 extends transversely from one side of the pot 64. A simulated tail 68 is mounted to a distal end of the arm 66, so that a person can grip the simulated tail 68 to properly position the pot 64 within the chamber 58 on the track structure 62 with the simulated tail 68 covering the rear access aperture 60 in the seat support 50. To remove the waste matter from the pot of this embodiment the user merely grips the vertically extending portion of the simulated animal tail and pulls rearwardly. Tail 68, arm 66, and pot 64 are removed as a unit. These parts may be formed as an single unitary molding. Alternately, the pot portion 64 may be formed so as to set atop a molded ring portion on the distal end of arm 66. As in the embodiment of FIGS. 1–4, the vertical orientation of the simulated animal tail handle 68 facilitates easy one-handed removal of pot 64. When pot 68 is fully installed in the chamber 58 the handle 68 projects rearwardly beyond seat support 50 (simulated animal body) and the upper portion of tail handle 68 effectively covers rear access aperture 60. It will be noted that this eliminates the need for any sort of separate door to cover aperture 60.

The simulated animal 48 can be a horse 70, an elephant 72 or any other type of simulated animal that can be ridden. A simulated dinosaur might be another possible form for the animal toy.

A list of reference numerals for the present invention follows:

10 improved commode combination
12 toy structure
14 potty structure
16 desk
18 seat support on 16
20 stanchion
22 table top
24 compartment
26 items
28 lid
30 potty seat on 18
32 cover
34 chamber in 18
36 rear access aperture in 18
38 track structure in 34
40 pot
42 arm on 40
44 plate on 42
46 handle on 44
48 simulated animal
50 seat support on 48
52 wheel
54 potty seat on 50
56 saddle cover
58 chamber in 50
60 rear access aperture in 50
62 track structure in 58
64 pot
66 arm on 64
68 simulated tail on 66
70 horse
72 elephant.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily determine that a popular cartoon character or even a prehistoric dinosaur might be used for the simulated body of the riding toy. Also, some or all of the wheels may be self steering castor wheels.

It is to be understood that the present invention is not limited to the sole embodiment described above, but encompasses any and all embodiments within the scope of the following claims:

I claim:

1. A children's toilet training device comprising;

a seat support for supporting a toy structure and an open commode seat;

said seat support having an upper surface with an open area to be in communication with said seat;

a seat cover hinged to said seat support for selectively covering said commode seat;

a vertically oriented rearwardly facing aperture located in a rear portion of said seat support;

a waste receptacle supported in an inner cavity in said seat support, said receptacle comprising:
 a pot for collecting excrement from the child;
 an elongated arm connecting said pot to a vertically oriented handle so that said pot may be removed with a single hand from said inner cavity through said rearwardly facing aperture without coming in close proximity with said excrement;

closure means on said elongated arm, proximate said handle, for covering said rearwardly facing aperture when said waste receptacle is fully inserted into said cavity with said pot in vertical alignment with said open area and with said handle being conveniently accessible outside said cavity;

wherein when said cover is in an up position the child can sit on said seat to toilet train and when said cover is in a down position the child can sit on said cover to be amused by said toy structure.

2. The combination of claim 1 wherein said seat support further comprises;

mounting means including two parallel horizontal tracks in said inner cavity for supporting said waste receptacle means for removal in a rearward direction.

3. The combination of claim 2, wherein said toy structure comprises a desk mounted on said seat support forward of said commode seat said desk comprising;

a table top affixed to said seat support and having a compartment for storing play items therein; and a lid hinged to a forward edge of said table top so as to cover the compartment so that the child can write and draw on said lid.

4. The combination of claim 3, wherein said closure means comprises a plate mounted at a right angle to an end of said elongated arm; and said handle comprises a vertically oriented closed loop mounted on the opposite side of said plate from said elongated arm.

5. The combination of claim 2, wherein said device comprises;

said toy structure being constructed in the form of an animal simulation including wheels for rolling on a flat support surface and an animal head mounted on said seat support forward of said commode seat and being suitable for grasping by the child;

said closure means comprises an upper portion of a simulated animal tail; and said handle comprises a lower portion of said simulated animal tail.

* * * * *